United States Patent
Rogers

(10) Patent No.: US 9,909,069 B2
(45) Date of Patent: Mar. 6, 2018

(54) PROCESS FOR RECYCLING OIL-SORBING POLYMERIC MEDIA

(71) Applicant: AbTech Industries, Inc., Scottsdale, AZ (US)

(72) Inventor: Chad A. Rogers, Phoenix, AZ (US)

(73) Assignee: AbTech Industries, Inc., Scottsdale, AZ (US)

( * ) Notice: Subject to any disclaimer, the term of this patent is extended or adjusted under 35 U.S.C. 154(b) by 192 days.

(21) Appl. No.: 14/540,976

(22) Filed: Nov. 13, 2014

(65) Prior Publication Data

US 2016/0137925 A1  May 19, 2016

(51) Int. Cl.

| C07C 1/00 | (2006.01) |
|---|---|
| C10G 1/10 | (2006.01) |
| C10G 1/00 | (2006.01) |
| C02F 1/28 | (2006.01) |
| B01J 20/26 | (2006.01) |
| B01J 20/34 | (2006.01) |
| C10G 1/06 | (2006.01) |
| C10G 9/00 | (2006.01) |
| C10G 11/00 | (2006.01) |
| C02F 101/32 | (2006.01) |
| C02F 103/10 | (2006.01) |

(52) U.S. Cl.
CPC .............. *C10G 1/00* (2013.01); *B01J 20/264* (2013.01); *B01J 20/3425* (2013.01); *B01J 20/3475* (2013.01); *C02F 1/285* (2013.01); *C10G 1/002* (2013.01); *C10G 1/065* (2013.01); *C10G 1/10* (2013.01); *C10G 9/00* (2013.01); *C10G 11/00* (2013.01); *C02F 2101/32* (2013.01); *C02F 2103/10* (2013.01)

(58) Field of Classification Search
CPC ........ C10G 1/00; C10G 1/002; B01J 20/3425; B01J 20/264; B01J 20/3475; C02F 1/285; C02F 2101/32; C02F 2103/10; C10M 175/00; C10M 175/0008; Y02W 30/50; Y02W 30/62; Y02W 30/625
USPC .......................... 585/11, 240, 241; 210/693
See application file for complete search history.

(56) References Cited

U.S. PATENT DOCUMENTS

| 3,756,948 | A | * | 9/1973 | Weinberg | ............... B01J 20/22 210/679 |
|---|---|---|---|---|---|
| 4,061,566 | A | | 12/1977 | Modell | |
| 4,094,776 | A | | 6/1978 | Noguchi et al. | |
| 5,569,801 | A | | 10/1996 | de Broqueville | |
| 5,639,383 | A | * | 6/1997 | Gajas Fuertes | ...... C10M 175/00 106/277 |
| 5,840,632 | A | * | 11/1998 | Miller | .................... B01D 53/02 442/121 |
| 6,143,172 | A | | 11/2000 | Rink et al. | |
| 6,344,519 | B1 | * | 2/2002 | Rink | .................. B01D 17/0202 210/924 |
| 6,541,569 | B1 | | 4/2003 | Morris et al. | |
| 6,723,791 | B2 | | 4/2004 | Rink et al. | |
| 7,229,560 | B2 | | 6/2007 | Rink et al. | |
| 2009/0314717 | A1 | * | 12/2009 | Fujieda | ..................... B01J 20/26 210/663 |
| 2011/0021647 | A1 | * | 1/2011 | Poutch | ..................... C08J 11/08 521/47 |
| 2012/0055852 | A1 | * | 3/2012 | Soane | ....................... B09C 1/02 209/2 |

FOREIGN PATENT DOCUMENTS

| CN | 1226574 A | | 8/1999 | | |
|---|---|---|---|---|---|
| EP | 0530169 A1 | | 3/1993 | | |
| JP | 49052180 A | * | 5/1974 | | |
| JP | 10-168221 A | | 6/1998 | | |
| JP | 10-168222 A | | 6/1998 | | |
| JP | 2004-066054 A | | 3/2004 | | |
| WO | WO 9014159 A1 | * | 11/1990 | .............. B01J 20/26 |
| WO | WO 2012007927 A1 | * | 1/2012 | .............. C09K 3/32 |

OTHER PUBLICATIONS

Bouvier, J. M. et al., "Pyrolysis of rubber wastes in heavy oils and use of the products," Resources and Conservation, 1986, vol. 12, pp. 77-93.

Garcia, Maria Teresa et al., "Study of the solubility and stability of polystyrene wastes in a dissolution recycling process," Waste Management, 2009, vol. 29, pp. 1814-1818.

Arandes, Jose M. et al., "Thermal recycling of polystyrene and polystyrenebutadiene dissolved in a light cycle oil," Journal of Analytical and Applied Pyrolysis. 2003, vol. 70, pp. 747-760.

Zhou, Mei Hua et al., "Oil absorbents based on styrene-butadiene rubber," Journal of Applied Polymer Science, 2003, vol. 89, pp. 1818-1824.

Prpich. George P. et al., "On the use, and reuse, of polymers for the treatment of hydrocarbon contaminated water via a solid-liquid partitioning bioreactor," Biotechnology Progress, 2008, vol. 24, pp. 839-844.

* cited by examiner

*Primary Examiner* — Pamela H Weiss

(74) *Attorney, Agent, or Firm* — Louis J. Hoffman; Diane L. Gardner

(57) ABSTRACT

Recycling spent hydrophobic polymeric media can beneficially utilize waste oil to dissolve the media. The method employs simple equipment and materials, many or all of which are already on location in various industrial operations such as fracking operations or food production factories. The method does not call for landfilling spent media, thus reducing the environmental impact and reducing expense. Transport costs for spent media and disposal fees can likely decrease. The resulting product can be sold to refineries for further processing and repurposing, thus generating additional revenue.

21 Claims, No Drawings

PROCESS FOR RECYCLING OIL-SORBING POLYMERIC MEDIA

BACKGROUND

The field of the invention relates to recycling polymeric, oil-sorbent materials.

Industrial operations that generate waste oil sometimes use oil-sorbing media to remove or recover additional oils, such as oils that remain suspended in aqueous liquids after an oil-separation step. An example is Smart Sponge® oil-sorbing media from Abtech Industries, Inc. of Scottsdale, Ariz. Eventually the oil-sorbing media becomes spent and is replaced with fresh media. Disposing of spent media is costly and presents multiple problems.

Transport of spent media is expensive, especially because many oil-generating operations may be situated in remote locations. Moreover, proper disposal in landfills must meet environmental guidelines for hazardous waste disposal. The media therefore may require further processing before disposal, adding to the time and expense of the overall operation. Placing spent media in landfills is not preferred because of environmental impact, even when satisfying applicable environmental guidelines. Therefore, there exists a need for an improved method of disposing of spent oil-sorbing media.

SUMMARY OF THE INVENTION

Recycling spent hydrophobic polymeric media can beneficially utilize waste oil to dissolve the media. The method employs simple equipment and materials, many or all of which are already on location in various industrial operations such as fracking operations or food production factories. The method does not call for landfilling spent media, thus reducing the environmental impact and reducing expense. Transport costs for spent media and disposal fees can likely decrease. The resulting product can be sold to reprocessing plants for further treatment and repurposing, thus generating additional revenue.

Objects and advantages pertaining to a recycling process for spent media may become apparent upon referring to the example embodiments disclosed in the following written description or appended claims. This summary is provided to introduce certain concepts in a simplified form, which are further described below. This summary is not intended to identify key features or essential features of the claimed subject matter, nor is it intended to be used as an aid in determining the scope of the claimed subject matter.

DETAILED DESCRIPTION

The terms "a" and "an" and variations thereof represent the phrase "at least one." In all cases, the terms "comprising," "comprises," "including," "includes," "contains," "having," and any variations thereof should not be interpreted as limited to the elements listed thereafter but rather as open-ended terms, as though the phrase "at least" were appended thereafter.

The conjunction "or" is to be construed inclusively (i.e., one, another, or both), unless it is explicitly stated otherwise (e.g., by use of "either . . . or," "only one of," or similar language) or two or more of listed alternatives are mutually exclusive within the particular context, in which case "or" would encompass only those combinations involving non-mutually exclusive alternatives.

The term "substantially," as modifying a parameter having a stated limit, is to be construed as meaning something that effectively possesses the same property or achieves the same function as that of the stated limit, and includes exactly the stated limit as well as insignificant deviations therefrom.

The term "approximately" is to be construed as meaning something having very nearly the stated value, and includes exactly the stated value as well as insignificant variations therefrom.

Unless otherwise specified, all words used herein carry their common meaning as understood by a person having ordinary skill in the art.

In cases where examples are listed, it is to be understood that combinations of any of the alternative examples are also envisioned. The scope of the invention is not to be limited to the particular embodiments disclosed herein, which serve merely as examples representative of the limitations recited in the issued claims resulting from this application, and the equivalents of those limitations.

Various features may be grouped together in example embodiments for the purpose of streamlining the disclosure, but this method of disclosure should not be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the detailed description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. Conversely, the scope of the appended claims does not necessarily encompass the whole of the subject matter disclosed herein.

If the word "means" or the phrase "step for" does not appear in a claim, applicant does not intend to invoke the provisions of law relating to "means/function" or "step/function" claiming.

The abstract is provided as required as an aid to those searching for specific subject matter within the patent literature. However, the abstract is not intended to imply that any elements, features, or limitations recited therein are necessarily encompassed by any particular claim. The scope of subject matter encompassed by each claim shall be determined by the recitation of only that claim.

Solvent.

In this context, the terms "waste oil" and "oil" refer to non-synthetic hydrocarbon compositions capable of being collected. Waste oil is produced in a wide variety of industries, either as a primary product or as a by-product. For example, energy companies generate waste oil both as primary products and as by-products, whereas food processing companies generate waste oil as a by-product. In this context, the term "waste oil" includes "used" oil as well as both refined and crude oil.

An example of a specific industrial process that generates waste oil is the process of fracturing ("fracking") subterranean formations, such as to produce crude oil or natural gas. Other examples of operations that generate waste oil are food manufacturing processes that use animal or vegetable oils or fats for cooking, and bottling plants that generate waste oil as a by-product.

Waste oils applicable to this process can be of various grades or types or generated by various industries. Any industrial application that generates waste oil and utilizes hydrophobic hydrocarbon polymeric oil-sorbent media could employ the process disclosed herein. Examples of waste oils include mineral oils, such as those containing xylenes, used in the petrochemical industry. Other examples of waste oils include animal and vegetable oils, such as those containing saturated or unsaturated trans fats and greases. In cases where the process is performed near a fracking operation, another example of waste oil can be produced oil from a well that otherwise would be refined.

The process involves mixing spent hydrophobic oleophilic polymeric media with waste oil. In most cases, waste oil is employed in an amount greater than or equal to the saturation point of the hydrophobic oleophilic media. This amount will vary depending on the polymeric composition of the media. The weight of the sorbed oil in the spent media can be included as a portion of the total amount of added waste oil. As a specific example, where the media comprises an SBS-EPDM material, waste oil can be added in an amount not less than about four times the weight of the virgin media, and about five times is a useful proportion. As another specific example, where the media comprises SEBS-EPDM, waste oil can be added in an amount not less than about eight times the weight of the virgin media, and about nine times is a useful proportion. As yet another specific example, where the media comprises SIS-EPDM, waste oil can be added in an amount not less than about nine times the weight of the virgin media, and about ten times is a useful proportion. In a further specific example, where the media comprises SIBS-EPDM, waste oil can be added in an amount not less than about twelve times the weight of the virgin media, and about thirteen times or more is a useful proportion. A range of waste oil (including sorbed oil) between approximately four and approximately fifteen times the weight of the virgin media can cover many useful examples of the process.

Waste oil can be used as the solvent for the recycling process alone or in combination with a complementary solvent. Properties of waste oil vary widely from industry to industry, and even within industries. For example, waste oil produced as a primary or by-product of industrial companies may vary significantly from geographic region to region. This is especially true for the oil and gas production industry, where waste oil can span a wide range of colors, consistencies, and compositions.

For example, light and sweet crude oil (typically $C_6$-$C_{10}$) has a relatively low viscosity and a specific gravity of about 0.7-0.84. Asphaltine crude oil (typically $C_{\geq 18}$) has a relatively high viscosity and a specific gravity of about $\geq 1.0$. Generic crude oil (typically $C_{\geq 4}$) has a relatively low viscosity and a specific gravity of about $\geq 0.6$. Oil and gas condensate (typically $C_4$-$C_9$) has a relatively low viscosity and a specific gravity of about 0.65-0.85. It is common for waste oil to be present primarily in these forms, as well as in mixtures thereof.

Viscous oils have fewer benzyl rings than those having lower specific gravity, and the addition of even large amounts of such waste oil may not be sufficient in totally dissolving the media. In such cases, it is optional to add a complementary solvent containing a higher number of benzyl rings to bring the media to its saturation point or beyond.

Complementary solvents can be added at any stage in the process. For example, a quantity of an appropriate complementary solvent material can be added to a quantity of spent polymeric media together with the waste oil, as a single-stage process. As an example of a dual-stage process, a complementary solvent can be added if the waste oil alone is not successful in sufficiently dissolving the media, as in the case where the resulting product takes a gel form or otherwise remains too viscous for easy transport. A useful complementary solvent can be an inexpensive or readily available, nonpolar, hydrocarbon-based solvent having a higher degree of ring structure and a lower specific gravity relative to the waste oil. The complementary solvent can be, for example, a non-polyaromatic hydrocarbon. Specific exemplary materials include toluene, benzene, xylenes, cymene, ethyl benzenes, and hexane. Mixtures of such materials can be used as the complementary solvent. The complementary solvent alternatively or additionally can comprise a type of waste oil having a lower specific gravity than that of the primary waste oil.

The desirable specific gravity of the complementary solvent will vary depending on the media being recycled, the specific gravity of the initial waste oil, and the point in the process at which the complementary solvent is added. For example, where the spent media is SBS-EPDM and the solvent extraction is performed in a single step, a possible combined specific gravity of the waste oil and complementary solvent can be approximately 0.8.

In this context, the term "solvent" refers to waste oil used alone or in combination with a complementary solvent as described herein, including multi-step processes wherein waste oil and complementary solvent are added to the process at different stages. Where the complementary solvent is also waste oil, as described herein, reference may be made to "primary solvent" or "primary waste oil" and "complementary solvent" or "complementary waste oil" for clarity.

Hydrophobic Polymeric Oil-Sorbing Media.

In this context, the terms "hydrophobic polymer," "hydrophobic polymeric media," "oil-sorbing media," "hydrophobic polymeric oil-sorbing media," "contact media," "media," and variations thereof, refer to hydrophobic oleophilic hydrocarbon polymer compositions having oil-sorbing properties, including the ability to sorb hydrocarbons. As described herein, the oil-sorbing media used for the purpose of extracting suspended oil in aqueous liquids is oleophilic, to sorb oil by incorporating it into the structure of the polymer. Sorbing includes absorption and adsorption. Such compositions include those known to persons having ordinary skill in the art, including those later discovered or developed.

Media comprising thermoplastic hydrophobic oleophilic hydrocarbon polymers free of inorganic components can be used in the process. Such hydrophobic polymers can have moderate to high hydrophobicity arising from a relatively high contact angle with respect to water, such as greater than approximately 50 degrees, or greater or equal to approximately 75 degrees, or greater or equal to approximately 85 degrees, or greater or equal to approximately 90 degrees; certain materials can have superhydrophobic characteristics as high as approximately 150-160 degrees. The oleophilic nature of such polymers can arise from either or both of a low contact angle with respect to oil, such as less than about 5 degrees, to facilitate high absorption, or highly crevassed surfaces, to facilitate high adsorption. Hydrophobic oleophilic hydrocarbon polymers having double bonds present in the polymer backbone and lacking an attached benzyl ring can be used. Even more specific example polymers are those in the class of hydrophobic oleophilic hydrocarbon polymeric materials comprising styrene. Yet more specific examples are those in the class of hydrophobic oleophilic hydrocarbon polymeric materials comprising about 10%-90% styrene by weight. Specific examples in those classes include materials comprising styrene-butadiene-styrene (SBS), styrene-ethylene-butylene-styrene (SEBS), styrene-isoprene-styrene (SIS), and styrene-isobutylene-styrene (SIBS), which comprise about 15%-80% styrene by weight. Other examples include hydrophobic oleophilic hydrocarbon polymeric materials having a high degree of surface area or a high degree of porosity, such as those disclosed for example in U.S. Pat. Nos. 6,344,519, 6,541,569, and 6,723,791, the disclosures of which are hereby incorporated herein in their entireties, which include the SBS/EPDM copolymer used in Smart Sponge® media. To the extent such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Process.

Contact media such as the hydrophobic hydrocarbon polymeric oil-sorbing media described herein is typically employed after any desired oil/water separation process has been performed. The resulting aqueous liquid is thereafter passed through the oil-sorbing media to remove hydrocarbons remaining from any such desired previous processes, along with certain suspended particles. Such remaining hydrocarbons are often dispersed in the water with droplet sizes of approximately 20-120 microns. Brine produced by fracking operations, for example, is frequently treated to remove salts and separate oils, but some suspended oil residuals remain after conventional separation techniques. Oil-sorbing polymer material can be employed to capture oil residuals as an additional step, to remove most residual oils highly efficiently. Smart Sponge® media has been used for this purpose. Through the process of sorbing, the oleophilic contact media expands in volume as the sorbed oil becomes incorporated into the structure of the polymer.

Fugitive oils remaining in the brine usefully are removed before discharge or reuse of brine water, otherwise, significant problems can occur. Such remaining oils have the ability to coat and foul downstream process sensors, which often rely on glass bulbs that normally cease operation as a result of oil adhering to them and that will remain inoperative until they are cleaned.

If the brine is reinjected into the earth, such as using a salt-water injection well, residual oil should be removed first, to ensure the fissure does not clog due to biofouling or organic fouling. Also, if brine water is discharged in situations where a permit has been obtained, applicable laws generally require the water to be free of significant oil concentrations. Allowed oil concentrations are generally about 100 mg/L. Oil removal using the described polymeric filter media can reduce residual oil below the maximum permitted.

Spent polymeric media has typically undergone gel-blocking, a condition involving surface gellification that blocks aqueous liquid from passing through, or makes such passage impractical. The aqueous liquid acts as a dissolution moderator, preventing solvation of the media, because further oils suspended in the aqueous liquid do not come into contact with the material of the media, either at the surface or inside. When the media reaches this point, it no longer performs its intended function, and it becomes a waste.

In the disclosed process, spent media is placed in a dissolution tank vessel, typically comprised of stainless steel. Such vessels typically comprise a hatch for loading the media, an inlet (typically located near the middle portion of the vessel), an outlet (typically situated at higher elevation relative to the inlet), and a pump for recirculation. One or more optional valves and lines can be attached. Examples of attached lines can include a waste oil/solvent inlet and end product outlet, both of which can be attached to the main outlet. Dissolution can occur in batches, or continuously as an in-line process.

Depending on the physical and chemical properties of the media and the properties of the waste oil used in the process, rending, or fragmentation, of the media may or may not be required. Rending can include grinding, shredding, maceration, mixing, or sonication. One or more optional rending steps can be performed at any stage of the dissolution process, including before or after the reactants have come into contact with one another. Rending of the media can be performed by a pump connected to an inlet and outlet of the vessel. Where the media is present in large forms or has relatively low surface area, rending performed before adding the waste oil can be beneficial, as it hastens the reaction time. When employed, rending can be performed in batch or continuously.

Smaller media forms or those having relatively high surface areas may undergo dissolution without rending. If the process results in a final product having the consistency of a gel, addition of a complementary solvent can break the gel, before or after any rending. In certain industries, though, the gel form of the product may have value, such as for asphalt or roofing applications. In other circumstances, rending can facilitate the dissolution process using the primary waste oil alone, without requiring the addition of a complementary solvent.

Because the properties of waste oil on hand at any given operation will vary widely and tend not to be analyzed before use, especially in oil and gas extraction operations, the results of adding waste oil to spent media, itself having varying composition depending on the type of media used, will yield a wide range of results. Additional primary waste oil or complementary solvent may or may not be required to obtain a substantially homogeneous fluid composition, as preferred. One of the benefits of the process described herein is that there need not be any significant analysis and measurement of the starting reactants. Waste oil on hand is added to the spent media in an amount thought sufficient to achieve the desired result. If the result has not been achieved after a sufficient amount of reaction time, additional primary or complementary solvent can be added. Positive results can be used to approximate future reactions using the same reactants in about the same quantities. Thus, after a small number of reactions achieving the desired result, the process can be fairly standardized going forward, by using similar amounts of same or similar reactants.

Although many polymer dissolution processes require the addition of heat to drive the process by elasticizing the polymers, no additional heat is required for this process. Addition of heat is optional, but in certain circumstances can hasten the process. The addition of waste oil (and complementary solvent, where desirable) alone generates an increase in entropy, thereby resulting in a spontaneous reaction.

Reaction times vary depending on the physical and chemical properties of the media, the properties and amounts of the waste oil (and complementary solvent, where desirable) used in the process, and whether or not rending is employed. Reaction times typically decrease inversely in proportion to the amount of waste oil (and optional second solvent, where desirable) used in the process. Typical reaction times absent the addition of heat vary from a matter of minutes to several hours.

Particulate matter and debris previously trapped in the media is normally released as the media dissolves and often accumulates as sediment in the tank. Any undissolved media often floats to the top of the liquid product and can be mechanically strained, for example by use of a grate attached to any outlet from the tank. Undissolved media can also be collected by skimming. Undissolved media can be sent separately to a refinery for further processing and repurposing, or returned to the spent media stream for repeated attempts at dissolution. Certain types of debris may also float on top of the liquid product and can be skimmed or mechanically removed if desired.

Once the dissolution process has been completed, an optional cracking step can be employed, although cracking is more typically performed at a refinery receiving the products produced by the process. Cracking methods include thermal and catalytic methods.

The process ultimately produces a fairly homogeneous solution, including gels, liquids, and non-Newtonian fluids. The reactants are typically substantially free from inorganic components, thereby resulting in products that are similarly substantially free from inorganic components. Because many industries that produce waste oil already transport oils to refineries or other reprocessing facilities, the resulting product can be transported by the same means already in place. For example, fracking operations typically already have made transport arrangements to deliver produced or recovered oils to oil refineries. Typically the product is transported via truck or pipeline. The resulting product can be combined with media-free waste oil or maintained separately.

The process produces many benefits. The costs of preparing spent media for disposal, the cost of transporting spent media to a landfill, and disposal fees typically can be eliminated. The spent media is repurposed rather than being a material requiring disposal. Waste oil captured by the spent media, which would otherwise have been lost through disposal of the spent media, instead can be recovered through this solvation process, thereby increasing the amount of product available for sale to the reprocessing facility. The dissolved hydrophobic media results in a desirable lower water content hydrocarbon product, which is important because refineries price products based upon water content and specific gravity. Given the types of polymeric media useful in the process, the oil recovered through the process often is enriched with styrene, thus making it more valuable than the initial waste oil alone.

Example 1

Twelve solvents were saturated with fine grade SBS-EPDM. In each case, 5 grams of SBS-EPDM was added to 100 mL of solvent at room temperature. Each batch was sonicated for 6 min. to accelerate the dissolution process. Approximately 0.8 mL of each sample's supernatant was centrifuged and air-dried. The results were as follows:

| Solvent | Recovery (g) |
|---|---|
| Hexane | 0.0132 |
| Cyclohexane | 0.0043 |
| Acetone | 0.0063 |
| DMSO | (would not dry) |

-continued

| Solvent | Recovery (g) |
|---|---|
| $CCl_4$ | 0.0088 |
| THF | 0.0182 |
| DMF | 0.0845 (could not be separated using centrifugation) |
| Heptane | 0.0041 |
| Chloroform | 0.0041 |
| TCB | (would not dry) |
| Toluene | 0.0172 |
| Benzene | 0.0361 |

Example 2

SBS-EPDM media weighing 6,080 lbs. adsorbs approximately 6,080 lbs. of gas condensate waste oil having a specific gravity of 0.76. To this waste media, another 24,320 lbs. of gas condensate waste oil (4,000 gallons or 95 barrels) is added. On estimate, this process generates $2,400 in additional revenue, assuming the final liquid is sold at a price of $70/BBL.

Example 3

An SEBS media weighing 6,080 lbs. adsorbs approximately 9,120 lbs. of crude oil having a specific gravity of 0.81. To this waste media, another 45,600 lbs. of crude oil (7,000 gallons or 170 barrels) is added. The intermediate product is a non-homogeneous gel. 18,240 lbs. of complementary solvent having a specific gravity of 0.79 is then added. The final product is a homogeneous liquid.

I claim:
1. A substantially homogeneous fluid hydrocarbon composition produced in the absence of additional heat comprising:
 a. a dissolved hydrophobic oleophilic hydrocarbon polymer or copolymer comprising 10%-90% by weight styrene and having oil-sorbing properties;
 b. oil sorbed by the polymer or copolymer; and
 c. waste oil, wherein the combined weight of the sorbed oil and the waste oil is between approximately four and approximately fifteen times the weight of the polymer or copolymer.
2. The composition of claim 1 further comprising a complementary solvent different from the part c waste oil.
3. A process comprising:
 a. combining in the absence of additional heat the following reactants:
  i. a hydrophobic oleophilic hydrocarbon polymer or copolymer comprising 10%-90% by weight styrene and having oil-sorbing properties, further comprising oil sorbed thereon; and
  ii. waste oil as a solvent, wherein the combined weight of the sorbed oil and the waste oil is between approximately four and approximately fifteen times the weight of the hydrophobic oleophilic hydrocarbon polymer or copolymer; and
 b. allowing the reactants to react for an amount of time sufficient to produce a substantially homogeneous fluid hydrocarbon composition.
4. The process of claim 3, wherein the polymer or copolymer is substantially free from inorganic components.
5. The process of claim 4, wherein the polymer or copolymer has a backbone comprising double bonds and lacks attached benzyl rings.

6. The process of claim 3 wherein the polymer or copolymer is selected from the group consisting of styrene-butadiene-styrene (SBS), styrene-ethylene-butylene-styrene (SEGS), styrene-isoprene-styrene (SIS), styrene-isobutylene-styrene (SIBS), and combinations thereof.

7. The process of claim 3, wherein the polymer or copolymer is a copolymer of styrene-butadiene-styrene block copolymer and ethylene-propylene-diene monomer (SBS-EPDM).

8. The process of claim 3 further comprising rending at least the polymer or copolymer.

9. The process of claim 3 further comprising thermal or catalytic cracking of the substantially homogeneous fluid hydrocarbon composition.

10. The process of claim 3, wherein the resulting product is a gel.

11. The process of claim 3, wherein the resulting product is a non-Newtonian fluid.

12. The process of claim 3, wherein the substantially homogeneous fluid hydrocarbon composition is substantially free from inorganic components.

13. The process of claim 3, wherein the reactants further comprise a complementary solvent different from the part (a)(ii) waste oil.

14. The process of claim 13, wherein the part (a)(ii) waste oil and complementary solvent are combined sequentially for a multistage process.

15. The process of claim 13, wherein the complementary solvent comprises a second waste oil having a lower specific gravity than the part (a)(ii) waste oil.

16. The process of claim 15, wherein the complementary solvent is a nonpolar hydrocarbon-based solvent substantially free from inorganic components and having a greater number of benzyl rings than the part (a)(ii) waste oil.

17. The process of claim 16, wherein the complementary solvent is a non-polyaromatic hydrocarbon.

18. The process of claim 17, wherein the polymer or copolymer has a backbone comprising double bonds and lacks attached benzyl rings.

19. The process of claim 9 further comprising maceration of the hydrophobic oleophilic hydrocarbon polymer or copolymer.

20. The process of claim 3, further comprising removing sediment or undissolved media from the substantially homogeneous fluid hydrocarbon composition.

21. The process of claim 3, further comprising rending at least the polymer or copolymer, removing sediment or undissolved media from the substantially homogeneous fluid hydrocarbon composition, and thermally or catalytically cracking the substantially homogeneous fluid hydrocarbon composition.

* * * * *

UNITED STATES PATENT AND TRADEMARK OFFICE
CERTIFICATE OF CORRECTION

PATENT NO. : 9,909,069 B2
APPLICATION NO. : 14/540976
DATED : March 6, 2018
INVENTOR(S) : Chad A. Rogers It is certified that error appears in the above-identified patent and that said Letters Patent is hereby corrected as shown below:

In the Claims

Column 9, Line 4 (Claim 6): replace "(SEGS)" with --(SEBS)--

Signed and Sealed this
Twenty-fourth Day of April, 2018

Andrei Iancu
*Director of the United States Patent and Trademark Office*